United States Patent [19]

Janac et al.

[11] Patent Number: 4,774,277

[45] Date of Patent: Sep. 27, 1988

[54] BLENDS OF POLYOLEFIN PLASTICS WITH ELASTOMERIC PLASTICIZERS

[75] Inventors: Karel C. Janac, Troy, Mich.; Robert C. Puydak, East Orange; Donald R. Hazelton, Chatham, both of N.J.

[73] Assignee: Exxon Research & Engineering Co., Florham Park, N.J.

[21] Appl. No.: 362,103

[22] Filed: Mar. 26, 1982

[51] Int. Cl.$^4$ .................................................. C08K 5/01
[52] U.S. Cl. ...................................... 524/474; 523/351; 524/484; 524/518; 524/523; 524/524; 524/525; 524/528; 525/210; 525/222
[58] Field of Search ............... 524/524, 525, 523, 528, 524/518, 474, 484; 525/210, 222; 523/351

[56] References Cited

U.S. PATENT DOCUMENTS

| | | | |
|---|---|---|---|
| 3,957,919 | 5/1976 | Bodungen et al. | 260/897 A |
| 4,032,600 | 6/1977 | MacAdams et al. | 264/310 |
| 4,059,654 | 11/1977 | Bodungen et al. | 260/897 A |
| 4,113,806 | 9/1978 | Watson et al. | 525/232 |
| 4,132,698 | 1/1979 | Gessler et al. | 260/33.6 AQ |
| 4,156,709 | 5/1979 | Kondo et al. | 264/171 |
| 4,191,798 | 3/1980 | Schumacher et al. | 524/524 |
| 4,212,787 | 7/1980 | Matsuda et al. | 525/232 |
| 4,220,579 | 9/1980 | Rinehart | 526/211 |
| 4,222,913 | 9/1980 | Cooper | 525/222 |
| 4,255,533 | 3/1981 | Bartz | 525/193 |
| 4,271,049 | 6/1981 | Coran et al. | 525/232 |
| 4,302,557 | 11/1981 | Yoshimura et al. | 525/222 |
| 4,303,571 | 12/1981 | Jansen et al. | 260/33.6 AQ |
| 4,309,332 | 1/1982 | Fischer et al. | 525/211 |
| 4,310,636 | 1/1982 | Bartz | 525/71 |
| 4,359,495 | 11/1982 | Schroeder et al. | 525/222 |
| 4,417,005 | 11/1983 | Tokieda et al. | 523/351 |
| 4,490,323 | 12/1984 | Thomson | 523/351 |

FOREIGN PATENT DOCUMENTS

| | | | |
|---|---|---|---|
| 0009547 | 5/1974 | Japan | 524/524 |
| 52-126450 | 10/1977 | Japan . | |
| 55-71739 | 5/1980 | Japan . | |

OTHER PUBLICATIONS

Derwent Abst. 54696W/33 Nippon (2-1975) J50010371.
Derwent Abst. 49012C/28 Idemitsu (5-1980) J55071736.
Derwent Abst. 06505C/04 Sumitomo (12-1979) J54157180.
Derwent Abst. 12679E/07 Mitsubishi (1-1982) J57002350.
"Exxon Elastomers for Polyolefin Modification" report by Exxon Chemical Co. U.S.A. (1975)-pp. 1-64.

Primary Examiner—Herbert J. Lilling
Attorney, Agent, or Firm—H. L. Cohen

[57] ABSTRACT

Compositions of matter useful in the preparation of film which is soft and has high tensile, tear and impact strength. The compositions comprise polyolefin plastics blended with an elastomeric plasticizer; the latter comprises polyethylene or a copolymer of ethylene and an unsaturated ester of a lower carboxylic acid, olefinic elastomer and hydrocarbon oil.

21 Claims, No Drawings

BLENDS OF POLYOLEFIN PLASTICS WITH ELASTOMERIC PLASTICIZERS

BACKGROUND OF THE INVENTION

This invention relates generally to the field of plastics blends or blends of polyolefin plastics with other polymers and, optionally, process aids, fillers, etc. Specifically, it is directed to blends of polyolefin plastics such as polypropylene, polypropylene reactor copolymer, polybutylene, linear low density polyethylene, and high density polyethylene with a polymeric concentrate. The polymeric concentrate is preferably elastomeric in nature and comprises a blend of polyethylene and/or a polymeric copolymer of ethylene, olefinic elastomer, oil and, optionally, process aids, antiblock additives, antioxidants, fillers, pigments, foaming agents, etc. More specifically, it is directed to compositions comprising blends of polypropylene and/or high density polyethylene and an elastomeric plasticizer. The elastomeric plasticizer is readily dispersed and the final compositions can be processed into films on equipment normally intended for low density polyethylene. Films produced from such compositions exhibit low secant modulus, high tear strength and high impact resistance compared to unmodified polyolefin plastics.

Polypropylene film is well known in the art, but it is typically produced by the cast or tubular water bath processes rather than employing the less complex equipment used for low density polyethylene. Polypropylene film produced using low density polyethylene equipment generally has low impact strength, is very stiff (high secant modulus) and has poor tear strength. Blending polypropylene with various elastomers can improve the impact strength of the polypropylene, but the overall balance of properties is jeopardized, e.g., tensile strength, tear strength, impact resistance and stiffness. More typically, ternary compositions are employed comprising polypropylene, elastomer and high density polyethylene (HDPE) wherein the desired components are directly blended, see, e.g., "Exxon Elastomers for Polyolefin Modification" (Exxon Chemical Company publication, pages 15–35). This reference suggests that the elastomer and HDPE are incorporated at levels of 5 to 15 weight percent. In addition to improved impact strength it is also stated that tensile strength and melt flow rate are depressed and, furthermore, there is no teaching that compositions prepared by merely directly blending the individual components results in a composition which can be processed on low density polyethylene film equipment.

Limited teachings are available which disclose the necessary incorporation of oil in a blend composition such as disclosed herein. However the proportions and properties disclosed in the references are quite different from what is contemplated herein. Furthermore, no reference teaches the unique method of preparing an elastomeric plasticizer which is then dispersed in the polyolefin phase, resulting in particularly desirable and useful properties in the final composition. U.S. Pat. No. 3,957,919 describes a thermoplastic elastomer composition which, optionally, can contain extender oil. The composition is hot blended in the presence of a free radical generating catalyst so as to subject the composition to a free radical reaction. The advance represented by this reference is not directed to the subject of the present invention but merely provides a means, specifically the presence of polyethylene (or polyethylene containing 10% or less of copolymerized alpha-olefins having 3 to 16 carbon atoms), in a blend of polypropylene and EPM (ethylene-propylene copolymer) or EPDM (ethylene-propylene terpolymer) which permits the use of a peroxide without significant polypropylene degradation. Furthermore, the reference specifically describes the preparation of the blend composition as a one step process; such a process is to be contrasted with the method disclosed and claimed herein which utilizes an elastomeric plasticizer concentrate which is blended with the polyolefin plastic. The types of products for which the blend composition is to be used is substantially different in the reference compared with the uses disclosed herein.

A later patent to the same inventors, U.S. Pat. No. 4,059,654, discloses the same basic composition and method as above, but the composition contains a slightly higher level of the polyethylene component so as to be better suited for use in the manufacture of flexible hose.

Elastomeric thermoplastic compositions containing oil and, optionally, a carbon black filler, for use in molded, paintable structures is disclosed in U.S. Pat. No. 4,132,698. This reference requires the polymeric components to have specific morphological characteristics in order to achieve two discrete, nonhomogeneous, continuous phases. The compositions of the reference differ from those disclosed herein with regard to the content of elastomer component as well as the contemplated uses; the instant compositions being film-forming whereas the reference is directed to molded or extruded articles. Furthermore, the concept disclosed herein of employing an elastomeric plasticizer to achieve unique blend performance properties and processability is absent from this and the other references disclosed herein.

U.S. Pat. No. 4,303,571 teaches the preparation of a film forming blend composition comprising ethylene-propylene elastomers, ethylene-vinyl acetate copolymers and a hydrocarbon oil plasticizer. However, the reference does not recognize that such a composition can be advantageously blended with polyolefin plastics nor, as taught herein, that the method of blending can be particularly beneficial.

Compositional differences also distinguish the instant invention from other references disclosing thermoplastic elastomer compositions, for example Japanese Kokai to Sumitomo Chemical, No. 77 126,450 and Japanese Kokai to Mitsui Petrochemical, No. 80 71,739. The former reference discloses a modified copolymer rubber composition for use in extruded and molded articles. Additionally, the compositions of the latter reference are intended to be treated with a peroxide crosslinking agent.

SUMMARY OF THE INVENTION

In accordance with the present invention, improved compositions of matter have been discovered for use in the preparation of a film which is soft and has high tensile, tear and impact strength. The composition is also useful in the production of fibers, tapes, woven fabrics, ropes, etc. The blends are comprised of (a) polyolefin plastics such as polypropylene, polypropylene reactor copolymer, polybutylene, linear low density polyethylene, high density polyethylene or mixtures thereof (b) polyethylene or a copolymer of ethylene and an unsaturated ester of a lower carboxylic acid, (c) olefinic elastomer, and (d) hydrocarbon oil.

A particularly advantageous method for preparing the film-forming, thermoplastic elastomeric composition comprises admixing preformed elastomeric plasticizer with the polyolefin plastics. The elastomeric plasticizer comprises a blend of components (b), (c) and (d) above.

The use of an elastomeric plasticizer is particularly advantageous in that it possesses stable pellet form, blends with polyolefin plastics over broad compositional ranges, and disperses readily under moderate melt mixing conditions.

DESCRIPTION OF THE PREFERRED EMBODIMENTS

Polyolefin plastics blends useful in this invention can employ polypropylene which can be a highly crystalline isotactic or syndiotactic polypropylene. Also, the polypropylene may be a copolymer, referred to as a polypropylene reactor copolymer, either random or block copolymer, containing minor amounts of an alpha-olefin comonomer of 2 to 16 carbon atoms. The level of comonomer which can be utilized is about 1 to about 20 weight percent, preferably about 2 to about 18, most preferably about 2 to about 15; a preferred comonomer is ethylene. The density of polypropylene can be from about 0.800 to about 0.900 g/cc. High density polyethylene (HDPE) useful as the polyolefin plastic to be blended with the elastomeric plasticizer has a density of about 0.941 to about 0.965 g/cc. High density polyethylene is an established product of commerce and its manufacture and general properties are well known in the art. Typically, HDPE has a relatively broad molecular weight distribution, characterized by the ratio of weight average to number average molecular weight, of from about 20 to about 40. HDPE for use in film can have a melt index (ASTM D1238, Method E) of from about 0.03 to about 5.0 g/10 min. and a density of from about 0.941 to about 0.965 g/cc.

Polybutylene, which is also useful in this invention, as the polyolefin plastic, is a term which generally refers to both poly (1-butene) homopolymer and the copolymer with, e.g., ethylene, propylene, pentene-1, etc. Particularly useful in this invention is the ethylene copolymer. Polybutylene is manufactured via stereospecific Ziegler-Natta polymerization of the monomer(s). Commercially useful products are of high molecular weight and isotacticity. A variety of commercial grades of both homopolymer and ethylene copolymer are available with melt indices that range from about 0.3 to about 20 g/10 min.; commercial ethylene copolymer grades have a melt index of from about 1 to about 2, although it is to be expected that a wider range would be acceptable, e.g., from about 0.5 to about 5 or higher, depending on the intended application.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors; the former process can be carried out at pressures of about 100 to 300 psi and temperatures as low as 100° C. Polymers can be made in the gas phase with melt indices and densities over the full commercial range and with molecular weight distributions from very narrow to very broad. Typically, the level of polyolefin plastics employed is from about 95 to about 15 weight percent of the composition, preferably about 92 to about 17 weight percent, most preferably about 90 to about 20 weight percent.

The elastomeric plasticizer comprises, in part, a polyethylene component which can be low density polyethylene (for example, about 0.910 to about 0.925 g/cc), medium density polyethylene (for example, about 0.925 to about 0.940 g/cc) or high density polyethylene (for example, about 0.941 to about 0.965 g/cc). The polyethylene can be prepared by a high pressure process or a low pressure process and includes linear polyethylene and copolymers of ethylene.

Polyethylene copolymers include copolymers of ethylene and alpha-olefins having 3 to 16 carbon atoms, for example, propylene, 1-butene, etc. Also included are copolymers of ethylene with an unsaturated ester of a lower carboxylic acid. In particular, copolymers of ethylene with vinyl acetate or alkyl acrylates, for example, methyl acrylate and ethyl acrylate, are employed. For the purposes of this invention, polyethylene copolymers are also considered to include blends of polyethylene and polyethylene copolymers. The polyethylene copolymers to be employed generally contain from about 50 to about 99 weight percent ethylene, preferably about 60 to about 95 weight percent ethylene, most preferably about 70 to about 90 weight percent ethylene. The level of polyethylene or polyethylene copolymer employed in the final blend composition is generally from about 2 to about 60 weight percent of the composition, preferably from about 3 to about 50 weight percent, most preferably about 4 to about 40 weight percent, for example from about 5 to about 35 weight percent.

The olefinic elastomer component of the elastomeric plasticizer can comprise ethylene copolymer elastomers, such as copolymers of ethylene with higher alpha-olefins such as propylene. The ethylene elastomer copolymers for use herein should include between about 30 and about 90 weight percent ethylene, preferably between about 35 and about 80 weight percent ethylene, most preferably between about 50 and about 70 weight percent ethylene. In some cases an oil extended elastomer can be employed in the compositions of this invention. In such case, the composition is adjusted to take account of the oil added by means of the oil extended elastomer as compared to the total amount of oil desired in the final composition.

It is also within the scope of this invention to employ as the olefinic elastomer an ethylene copolymer elastomer comprising a terpolymer of ethylene, a higher alpha-olefin such as propylene, and a nonconjugated diene (the terpolymer commonly referred to as EPDM). In such elastomers the nonconjugated diolefin may be straight chain, branched chain or cyclic hydrocarbon diolefins having from 6 to 15 carbon atoms, such as the following:

A. straight chain acyclic dienes such as: 1,4-hexadiene; 1,6-octadiene;

B. branched chain acyclic dienes such as: 5-methyl-1,4-hexadiene; 3,7-dimethyl-1,6-octadiene; 3,7-dimethyl-1,7 octadiene and the mixed isomers of dihydro-myrcene and dihydro-ocinene;

C. single ring alicyclic dienes such as: 1,3-cyclopentadiene; 1,4-cyclohexadiene; 1,5-cyclooctadiene; and 1,5-cyclododecadiene;

D. multi-ring alicyclic fused and bridged ring dienes such as: tetrahydroindene; methyltetrahydroindene;

dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene; 5-cyclohexylidene-2-norbornene; 5-vinyl-norbornene; and norbornadiene.

Of the non-conjugated dienes typically used to prepare these copolymers, preferred are dicyclopentadiene, 1,4-hexadiene, 5-methylene-2-norbornene and 5-ethylidene-2-norbornene; 5-ethylidene-2-norbornene (ENB) and 1,4-hexadiene are particularly preferred diolefins. EPDM elastomers and their method of manufacture are now well known to those skilled in the art. Oil extended EPDM elastomers are also within the scope of disclosed EPDM elastomers. Preferred EPDM elastomers contain about 30 to about 90 weight percent ethylene, more preferably about 35 to about 80 weight percent ethylene, most preferably about 50 to about 70 weight percent ethylene, and from about 0.5 to about 15 weight percent nonconjugated diolefin, e.g., ENB.

The olefinic elastomer useful in this invention can also be polyisobutylene, copolymers of isobutylene and isoprene (generally known as butyl rubber) and halogenated copolymers of isobutylene and isoprene (generally known as halogenated butyl rubber, such as chlorinated, brominated and chlorobrominated butyl rubber). Butyl rubber is a vulcanizable rubber copolymer containing from about 85 to 99.5 percent combined isoolefin having from 4 to 8 carbon atoms and 0.5 to 15 percent combined conjugated diolefin having from 4 to 8 carbon atoms. Such copolymers and their preparation are well known, and generally the isoolefin is a compound such as isobutylene and the diolefin is a compound such as butadiene or isoprene. Halogenated butyl rubber is also well known; chlorinated and brominated butyl rubber generally contain at least about 0.5 weight percent combined halogen and up to about 1 atom of halogen per double bond in the copolymer; chlorobrominated butyl rubber generally contains from about 1.0 to about 3.0 weight percent bromine and from about 0.05 to about 0.5 weight percent chlorine.

The level of olefinic elastomer employed in the final blend composition is generally from about 1 to about 50 weight percent of the composition, preferably from about 2 to about 40 weight percent, most preferably about 3 to about 30 weight percent.

A hydrocarbon oil is also incorporated into the thermoplastic elastomeric blend composition as a component of the elastomeric plasticizer. The hydrocarbon oils which can be used include aromatic, naphthenic and paraffinic types. Aromatic oils are less preferred in some applications because of potential color limitations and regulations of the United States Food and Drug Administration, especially where the film or finished product comes into contact with food. For certain applications an especially "clean" oil may be preferred, such as a white mineral oil, a petroleum hydrocarbon oil (e.g., Primol, marketed by Exxon Company, USA). The level of hydrocarbon oil employed in the final blend composition is generally from about 1 to about 30 weight percent of the composition, preferably from about 2 to about 20 weight percent, most preferably from about 3 to about 15 weight percent.

Considering the elastomeric plasticizer independently of the total (or final) thermoplastic elastomeric blend composition, the amount of polyethylene or copolymer of ethylene would be about 20 to about 70 weight percent of the elastomeric plasticizer, the olefinic elastomer from about 20 to about 80 weight percent and the hydrocarbon oil from about 1 to about 35 weight percent.

A further embodiment of this invention is the incorporation into the elastomeric plasticizer composition of a small percentage of polyolefin plastics, such as polypropylene, polypropylene reactor copolymer, polybutylene, linear low density polyethylene, high density polyethylene or mixtures thereof, in order to improve the storage stability and ease of handling of the elastomeric plasticizer. Useful levels of such polyolefin plastic would be up to about 30 weight percent, preferably up to about 20 weight percent, most preferably up to about 15 weight percent, for example, up to about 10 weight percent based on the weight of the elastomeric plasticizer. The proportions of elastomeric plasticizer and polyolefin plastics are adjusted for the final composition in order to take into account the polyolefin plastic present in the elastomeric plasticizer.

In addition to the essential ingredients of the overall thermoplastic elastomeric composition (polyolefin plastic and elastomeric plasticizer as previously defined) as well as the optional use of a small percentage of polyolefin plastic in the elastomeric plasticizer (as previously disclosed), various optional ingredients can by incorporated into the composition in order to achieve various cost and/or performance objectives in specific end-use applications. For example, one can use such materials as process aids (e.g., stearic acid), lubricants (e.g., oleamide), antiblocking aids, antioxidants, foaming agents and fillers and pigments. The latter two classes of materials can be used at levels up to about 40 weight percent based on the weight of the total composition.

Preparation of compositions of this invention, i.e., the blend of polyolefin plastics and elastomeric plasticizer as described above, can be achieved in several different ways. The polyolefin plastics and elastomeric plasticizer are brought into intimate contact by, for example, dry blending these materials and then passing the overall composition through a compounding extruder. Alternatively, the polyolefin plastics and elastomeric plasticizer can be fed directly to a mixing device such as a compounding extruder, high shear continuous mixer, two roll mill, an internal mixer such as a Banbury, etc. The optional ingredients previously described can be added to the composition during this mixing operation. It is also possible to achieve melt mixing in an extruder section of a film line or in an injection molding machine. Overall, the objective is to obtain a uniform dispersion of all ingredients and this is readily achieved by inducing sufficient shear and heat to cause the plastics component(s) to melt. However, time and temperature of mixing should be controlled as is normally done by one skilled in the art so as to avoid molecular weight degradation and unnecessary volatilization of oil. Depending on the polyolefin plastics component(s) employed, a melt temperature range of about 250° F. to about 550° F. could be expected. Where extruder mixing is employed the length to diameter (L/D) ratio of the screw should be at least 10/1, preferably at least 15/1.

Generally, the elastomeric plasticizer is prepared in a separate operation from the preparation of the final composition. However, it should be recognized that it is possible to separate these steps only minimally so that a sequential two stage batch process produces the final composition or alternatively, a continuous process can be achieved by using, for example, a mixing extruder with multiple feed sections.

Where it is preferred to prepare the elastomeric plasticizer as a separate operation, process conditions known to those skilled in the art are followed in order to obtain uniform dispersion of the ingredients. The elastomeric plasticizer can advantageously be prepared in pellet form so that it can be fed into the final mixing stage, with the olefinic plastics, using plastics pellet metering equipment.

Preparation of the elastomeric plasticizer is readily achieved by using mixing equipment well known in the art so as to obtain high shear. For example, such mixing can be obtained in an internal mixer such as a Banbury, on a two roll mill, in a continuous mixing extruder, high shear continuous mixer, etc. Those skilled in the art are familiar with the principles of controlling time, temperature and sequence of ingredients so as to maximize uniformity of dispersion of the ingredients in the composition. Pelletization of the elastomeric plasticizer can be carried out after mixing and is preferred so that such pellets can readily be handled and subsequently conveniently blended with pellets of the polyolefin plastics in order to prepare the final composition.

It is recommended that the melt temperature of the elastomeric plasticizer be kept under 450° F. during its preparation to minimize liberation of acetic acid (where ethylene vinyl acetate is used in the formulation). It is generally most convenient to mix the elastomeric plasticizer in a two-step Banbury mixing operation, especially if it is desirable to minimize the amount of undispersed particles of olefinic elastomers in the final film. The first pass is typically used to blend the olefinic elastomer and polyethylene or copolymer of ethylene as previously defined, and the second is used to extend the mixture with the oil and other ingredients (e.g., processing aids, fillers, etc.). Dump temperatures are typically 320° F.–380° F. for the final oil-containing mixture.

Following preparation of the final composition (polyolefin plastics plus elastomeric plasticizer and optional ingredients), the blend can be used to manufacture the unique film which results. Where polypropylene is the polyolefin, soft polypropylene films can be produced which are processable on low density polyethylene blown and cast equipment without any modifications. It can also be used on other types of equipment commonly used to produce plastic films, e.g., tubular water bath extrusion process, blown or cast co-extrusion process, extrusion coating onto another substrate, etc.

Since the elastomeric plasticizer disperses readily in the polyolefin plastics in all proportions cited herein, even under moderate melt mixing conditions, mixing can be achieved just prior to end use, for example, in the extruder section of a film line or an injection molding machine.

Film produced according to the compositions and methods taught herein has excellent drawability, with high quality film being obtained at gauges as low as 0.5 mil; it is expected that high quality film can be obtained in gauges even as low as 0.3 mil. The films have a low secant modulus, high tear strength, impact and puncture resistance, while having good temperature resistance and high tensile strength contributed by the polyolefin plastics.

In addition to film, the compositions disclosed herein can be used to prepare fibers, tapes, woven fabrics, ropes, and products made by injection molding, blow molding, sheet forming, thermoforming, extruding etc., having especially in comparison to polypropylene increased flexibility, decreased splittiness and fibrillation, improved heat sealing, and improved absorption of inks and dyes.

The scope and significance of the present invention may be more fully understood with reference to the following specific examples thereof.

EXAMPLE 1

Polypropylene and low density polyethylene films were prepared and properties compared to blend compositions of the present invention, i.e., polypropylene containing elastomeric modifier. In one experiment (Table I(d)) the elastomeric plasticizer was a blend of 49% ethylene methyl acrylate (PE-2205, 2.4 MI @ 190° C., 0.942 g/cc density) 28% ethylene propylene rubber (Vistalon 3708, 65% ethylene, 3.7% ENB) 20% oil, 2% slip agent (Oleamide) and 1% stearic acid. To prepare the plasticizer, resin and elastomer were fluxed in a 1D size Banbury for 1 minute. After 2 minutes of mixing the oil was added and the mixture attained flux conditions again after 4½ minutes. At 5 minutes, the other materials were added and the batch was dropped at 295° F. in 6½ minutes. The blend was then strand cut, pelletized and Banbury mixed 4½ minutes with the polypropylene (grade SA-861) reaching a dump temperature of 380° F. In experiment (e) of Table I a similar elastomeric plasticizer composition was prepared as an experiment (d), it was blended 50/50 with polypropylene as described above and used to produce a cast film. Film properties of the compositions of this invention are summarized in Table I and compared to unmodified polyolefin Plastics films.

EXAMPLE 2

This example shows the effect of elastomeric plasticizer concentration in a polypropylene blend on several properties of extruded melt drawn tapes (Table II). The elastomeric plasticizer contained 51% UE-631, 28% VISTALON 3708, 20% Primol 355, and 1% stearic acid. Its method of preparation was similar to that cited in Example 1. The polypropylene grade used was Escorene PP 1012, an injection molding resin having a density of 0.900 g/cc and a melt flow rate of 5.3 at 230° C. (condition L).

EXAMPLE 3

The effect on blown film properties of varying the composition of the elastomeric plasticizer is shown in this example. The polypropylene grade remained constant as did the blend ratio of polypropylene and elastomeric plasticizer (60/40). Film properties are shown in Table III; MD refers to machine direction, TD to transverse direction. The elastomeric plasticizer and the blend with polypropylene were prepared as previously described in Example 1.

EXAMPLE 4

In this example high molecular weight, high density polyethylene (HDPE, grade Hostalen®9255F) was used as the polyolefin plastic. Pellets of HDPE were dry blended with an elastomeric plasticizer (in the ratio 75 HDPE: 25 elastomeric plasticizer) comprising:

Ethylene vinyl acetate (14 wt.% vinyl acetate, grade UE 622): 48%
EPDM rubber (65 wt.% ethylene, grade, Vistalon 3708): 28%
Oil (grade, Arco® Prime 400): 23%

Stearic Acid: 1%

The dry blended composition was passed through a 2½ inch dia. Royle compounding extruder and blown into a film using a 2½ in. dia. Alpine extruder. Surprisingly, it was possible to produce a 1 mil gauge film with the composition of this invention. Compared to prior art film comprising a blend of HDPE and polyisobutylene the film of this invention produced in this example showed better clarity, less tendency to stress whiten when creased and higher machine direction tear strength in a 4 mil film. Properties are summarized in Table IV.

EXAMPLE 5

The experiment of Example 4 was repeated except that 1 mil films were prepared and properties of the blend of high molecular weight HDPE with the elastomeric plasticizer were compared with controls of unplasticized HDPE; one was the high molecular weight plastic used in the blend and a second, a medium molecular weight HDPE. Data are summarized in Table V.

EXAMPLE 6

The addition of elastomeric plasticizer to polybutylene (grade 8640, an ethylene-1-butene copolymer, MI=1.0 at 190° C.) was evaluated using a conventional low density polyethylene blown film line. The formulation of the elastomeric plasticizer corresponds to that used in Example 3 and its method of preparation was as described in Example 1. The plasticizer concentrate was dry blended with pellets of polybutylene in ratios of 75:25 and 50:50 polybutylene:plasticizer and fed directly to the hopper of a 1½ inch, 24:1 L:D extruder. The elastomeric plasticizer dispersed well in the polybutylene and the bubble demonstrated greater stability over straight polybutylene. Properties of the resulting films are given in Table VI. The films exhibited high toughness, greater clarity, and a softer feel relative to neat polybutylene.

EXAMPLE 7

This example describes the use of polyisobutylene (grade VISTANEX®L-80) as a component of the elastomeric plasticizer. The elastomeric plasticizer was prepared in a Banbury mixer according to mixing procedures described earlier. It was then underwater-pelletized using a 2½ inch, 24:1 L:D extruder.

The plasticizer pellets were then dry blended with polypropylene (grade-Escorene PP 5052) in the ratio 60PP:40 elastomeric plasticizer and underwater-pelletized, again using a 2½ inch extruder. Film was blown on a commercial 1½ inch LDPE blown film line using a die gap of 23 mils. The film processed easily and resulted in the properties indicated in Table VII.

EXAMPLE 8

An elastomeric plasticizer of the following formulation: 37% UE-622 EVA, 12% UE-645 (28% vinyl acetate, 1.0 MI), 28% VISTALON 3708, 23% Primol 355, and 0.2%. Irganox 1076, was extruder mixed at a 75:25 ratio with linear low density polyethylene (LLDPE, grade LPX-1, 1.0 MI, 0.918 g/cc) and processed into film on a conventional low density polyethylene line using a die gap of 23 mils. The plasticizer had been Banbury mixed and pelletized as previously described. Unlike neat LLDPE, which normally requires wider die gap settings and a specialized screw design, the plasticized LLDPE processed well on the unmodified equipment.

TABLE I

| EXPERIMENT | | a | b | c | d | e |
|---|---|---|---|---|---|---|
| Polyolefin Plastic | | PP[1] | PP[2] | LDPE[3] | 60% PP[4] | 50% PP[5] |
| Elastomeric Plasticizer | | — | — | — | 40% | 50% |
| Film Type | | Blown | Cast | Blown | Blown | Cast |
| Blow Up Ratio | | 3.1 | — | 2.55 | 2.55 | — |
| Gauge, mils | Direction | 1.1 | 1.0 | 1.0 | 1.0 | 1.0 |
| Yield Strength, psi | Machine (M) | 5230 | 3400 | 1430 | 1596 | — |
| ASTM - D882 | Transverse (T) | — | 3400 | 1565 | 1519 | — |
| Elongation at Yield | M | 15 | 10 | 10 | 25 | — |
| ASTM - D882, % | T | — | 10 | 10 | 20 | — |
| Tensile Strength, psi | M | 6170 | 7000 | 2397 | 5179 | 6379 |
| ASTM - 882 | T | 3320 | 7000 | 3849 | 4722 | 3932 |
| Ultimate Elongation, % | M | 505 | 700 | 420 | 640 | 640 |
| | T | 10 | 700 | 155 | 655 | 690 |
| 1% Secant Modulus, psi | M | 168,100 | 110,000 | 32,567 | 36,500 | 28,570 |
| ASTM - D882 | T | 185,000 | 110,000 | — | — | 24,300 |
| Elmendorf Tear, g/mil | M | 6 | 30 | 126 | — | 112 |
| ASTM - D1922 | T | 9 | 100 | 56 | — | 320 |
| Dart Drop Impact, grams ASTM - D1709 (F50) | | 10 | 100 | — | — | 360 |

[1]Polypropylene-grade Profax PD 064
[2]Polypropylene-grade Profax PD 742
[3]Low Density Polyethylene-grade LD-130
[4]60% Polypropylene-grade SA-861 40% Elastomeric Plasticizer (19.6% EMA 2205, 11.2% VISTALON 3708, 8% PRIMOL 355, 0.8% Oleamide, 0.4% stearic acid)
[5]50% Polypropylene-grade SA861, 50% Elastomeric Plasticizer (24.5% EVA-UE-631, 14% VISTALON 3708, 10% PRIMOL 355, 0.5% stearic acid, 1% Oleamide)
a,c,d Made on 1-½" Sterling Blown Film Line
b Made on 6" Black Clawson Cast Film Line
e Made on 4-½" Black Clawson Cast Film Line

TABLE II

| PROPERTIES OF EXTRUDED MELT-DRAWN TAPES | | | |
|---|---|---|---|
| COMPOSITION | a | b | c |
| POLYPROPYLENE | 85 | 70 | 50 |
| ELASTOMERIC PLASTICIZER | 15 | 30 | 50 |
| MELT INDEX AT 190° C. | 2.5 | 3.5 | 3.0 |
| MELT FLOW RATE AT 230° C. | 5.1 | 7.0 | 7.5 |
| PHYSICAL PROPERTIES OF EXTRUDED MELT-DRAWN TAPES | | | |
| TENSILE AT YIELD, PSI | 3190 | 2260 | 1580 |

TABLE II-continued

PROPERTIES OF EXTRUDED MELT-DRAWN TAPES

| COMPOSITION | a | b | c |
|---|---|---|---|
| ELONGATION AT YIELD, % | 15 | 18 | 25 |
| ULTIMATE TENSILE, PSI | 5600 | 5300 | 5100 |
| ULTIMATE ELONGATION, % | 725 | 810 | 875 |
| STIFFNESS | DECREASING → | | |
| SHORE D HARDNESS | 60 | 55 | 42 |

TABLE III

PROPERTIES OF BLOWN FILM[1]

| | EXPERIMENT | | | | |
|---|---|---|---|---|---|
| VARIATION IN BASE FORMULA[2] | a OIL EXTENDED EPDM[3] | b EP COPOLYMER[4] | c ETHYLENE METHYL ACRYLATE COPOLYMER[5] | d LOW DENSITY POLYETHYLENE[6] | e ETHYLENE VINYL ACETATE COPOLYMER[7] |
| AVG. GAUGE, mils | 1.1 | 1.1 | 1.0 | 1.1 | 1.2 |
| BLOW UP RATIO | 2.55 | 2.55 | 2.55 | 2.55 | 2.55 |
| MODULUS AT YIELD, PSI | | | | | |
| MD | 1462 | 1718 | 1596 | 2284 | 1603 |
| TD | 1466 | 1731 | 1519 | 1974 | 1450 |
| ELONGATION AT YIELD, % | | | | | |
| MD | 25 | 25 | 25 | 35 | 30 |
| TD | 20 | 20 | 20 | 25 | 20 |
| 10% MODULUS, PSI TD | 1262 | 1590 | 1339 | 1784 | 1299 |
| 25% MODULUS, PSI MD | 1462 | 1718 | 1596 | 2264 | 1591 |
| TENSILE STRENGTH, MD | 3774 | 4381 | 5179 | 5132 | 4364 |
| PSI TD | 4076 | 4783 | 4722 | 4379 | 3732 |
| SECANT MODULUS, PSI | 30,433 | 39,200 | 36,500 | 47,500 | 40,367 |
| ELONG., % | | | | | |
| MD | 625 | 640 | 640 | 590 | 595 |
| TD | 675 | 675 | 655 | 640 | 655 |

[1] 60% POLYPROPYLENE, 40% ELASTOMERIC PLASTICIZER
[2] Base Formula: 49% EVA-UE-631, 28% VISTALON 3708, 20% PRIMOL 355, 2% oleamide, 1% stearic acid
[3] EP-ENB TERPOLYMER, 75 phr oil, 66 wt % ethylene (grade-Vistalon ® 3777)
[4] Ethylene = 77 wt % (grade-Vistalon 719)
[5] PE-2205, 2.4 dg/min MI at 190° C., 0.942 g/cc density
[6] Escorene LD-106, 2.8 MI at 190° C., 0.919 g/cc density, 106.5° C. MP
[7] Vinyl acetate = 9% (grade-Escorene LD-401, 3.4 MI at 190° C., 0.929 g/cc density)

TABLE IV

HIGH DENSITY POLYETHYLENE FILMS[1]

| HDPE: | | | | | |
|---|---|---|---|---|---|
| 0.4 MI | 100 | 80 | 70 | 60 | — |
| 0.1 MI | — | — | — | — | 75 |
| Polyisobutylene | — | 20 | 30 | 40 | — |
| Elastomeric Plasticizer | — | — | — | — | 25 |
| Average Gauge, mils | 4.0 | 4.0 | 4.0 | 4.0 | 3.78 |
| Tensile Strength, psi | | | | | |
| @ Yield MD | 3800 | 2700 | 2100 | 1700 | 2500 |
| TD | 4200 | 2700 | 2100 | 1500 | 2550 |
| @ Break MD | — | — | — | — | 5100 |
| TD | — | — | — | — | 5100 |
| Elongation, % | | | | | |
| @ Yield MD | 10 | 15 | 15 | 20 | 20 |
| @ TD | 10 | 10 | 10 | 10 | 20 |
| @ Break MD | — | — | — | — | 760 |
| TD | — | — | — | — | 750 |
| 1% Secant Modulus, psi | | | | | |
| MD | 116,000 | 87,000 | 64,000 | 48,000 | 63,400 |
| TD | 148,000 | 91,000 | 68,000 | 50,000 | 68,200 |
| Elmendorf Tear, g/mil | | | | | |
| MD | 20 | 50 | 70 | 120 | 270 |
| TD | 40 | 200 | 350 | >360 | 400 |
| Dart Drop Impact, | | | | | |
| $F_{50}$, gm | | | | | |
| 1½" dart, 26 inch drop | 150 | 540 | 700 | 940 | 560 |

[1] HDPE/polyisobutylene films - Source of Data: "Exxon Elastomers for Polyolefin Modification". HDPE-0.4 melt index; Polyisobutylene-grade, Vistanex ® L-120

TABLE V

BLOWN SOFT HDPE FILM

| | HDPE Controls[1] | | High Mol. Wt. HDPE With Elastomeric Plasticizer |
|---|---|---|---|
| | Med. Mol. Wt. HDPE | High Mol. Wt. HDPE | |
| Average Gauge, mils | 0.92 | 0.98 | 1.0 |
| Tensile Strength, psi | | | |
| @ Yield MD | 3850 | 4650 | 3450 |
| TD | 3600 | 3950 | 3350 |
| @ Break MD | 8450 | 7300 | 8350 |
| TD | 4700 | 6750 | 5800 |
| Elongation, % | | | |
| @ Yield MD | 10 | 10 | 10 |
| TD | 10 | 10 | 10 |
| @ Break MD | 510 | 470 | 470 |
| TD | 690 | 490 | 630 |
| 1% Secant Modulus, psi | | | |
| MD | 120,900 | 156,800 | 76,100 |
| TD | 168,100 | 161,300 | 102,900 |
| Elmendorf Tear, g/mil | | | |
| MD | 30 | 40 | 30 |
| TD | 520 | 60 | 360 |
| Dart Drop Impact, grams[2] | >30 | 105 | 97 |
| Puncture Impact, In-lbs/mil | 410 | 540 | 500 |
| Haze, % | 88 | 89 | 34 |

TABLE V-continued

BLOWN SOFT HDPE FILM

| | HDPE Controls[1] | | High Mol. Wt. HDPE With Elastomeric Plasticizer |
|---|---|---|---|
| | Med. Mol. Wt. HDPE | High Mol. Wt. HDPE | |
| Gloss 45°, % | 3 | 4 | 15 |

[1]Med. Mol. Wt. = ALATHON ® 7815 (MI = 0.4); High Mol. Wt. = HOSTALEN ® 9255F (MI = 0.1)
[2]F$_{50}$ Method 1¼" dart, 26" drop

TABLE VI

Properties of POLYBUTYLENE BASED BLOWN FILMS

| | | | |
|---|---|---|---|
| Polybutylene 8640, % | 100 | 75 | 50 |
| Elastomeric Plasticizer, % | — | 25 | 50 |
| Average Sample Gauge, mils | 3.95 | 3.5 | 4.1 |
| 100% Modulus, psi | | | |
| MD | 2955 | 2403 | 1696 |
| TD | 2333 | 1997 | 1504 |
| 300% Modulus, psi | | | |
| MD | 5686 | 4496 | 3063 |
| TD | 4023 | 3634 | 2628 |
| Modulus at 1% Extension, psi | 382 | 171 | 142 |
| Tensile Strength at Break, psi | | | |
| MD | 6482 | 5573 | 4211 |
| TD | 5264 | 5232 | 3645 |
| % Elongation at Break | | | |
| MD | 355 | 415 | 490 |
| TD | 410 | 485 | 475 |
| Elmendorf Tear Strength (ASTM D-1922), g/mil | | | |
| MD | — | 308 | NT[1] |
| TD | — | 444 | NT |

[1]No Tear

TABLE VII

PROPERTIES OF MODIFIED POLYPROPYLENE FILM (BLOWN)[1]

| | | |
|---|---|---|
| Average Gauge, mils | 1.0 | 3.8 |
| Tensile Strength, psi | | |
| @ Yield MD | 2,712 | 2,318 |
| TD | 2,373 | 2,476 |
| @ Break MD | 6,780 | 5,545 |
| TD | 4,745 | 5,523 |
| Elongation, % | | |
| @ Yield MD | 25 | 25 |
| TD | 25 | 25 |
| @ Break MD | 570 | 720 |
| TD | 505 | 665 |
| 1% Secant Modulus, psi | | |
| MD | — | 47,830 |
| TD | — | 40,910 |
| Elmendorf Tear, g/mil | | |
| MD | 78 | 85 |
| TD | 192 | 76 |

[1]Polypropylene 60%, Elastomeric plasticizer 40%. Polypropylene grade: Escorene PP 5052, 1.2 MFR (Condition L); Elastomeric Plasticizer: 49% UE-645 (28% VA content, 1.2 MI), 28% VISTANEX L-80, 23% Primol 355, 0.2% Irganox 1076.

What is claimed is:

1. A method for preparing a film-forming, thermoplastic elastomeric blend composition comprising admixing from about 5 to about 85 weight percent elastomeric plasticizer with from about 95 to about 15 weight percent polypropylene, polypropylene reactor copolymer, polybutylene, linear low density polyethylene, high density polyethylene, or mixtures thereof in which said elastomeric plasticizer comprises a blend composition of:
   (a) polyethylene or a copolymer of ethylene and an unsaturated ester of a lower carboxylic acid from about 20 to about 70 weight percent,
   (b) olefinic elastomer from about 20 to about 80 weight percent and
   (c) hydrocarbon oil from about 1 to about 35 weight percent.

2. The composition of claim 1 wherein said olefinic elastomer is selected from the group consisting of polyisobutylene, isobutylene-isoprene copolymer elastomers and halogenated isobutylene-isoprene copolymer elastomers.

3. The composition of claim 1 wherein said polyethylene of said component (b) is selected from the group consisting of high density polyethylene and linear low density polyethylene.

4. The composition of claim 1 wherein said polypropylene reactor copolymer includes ethylene from about 1 to about 20 weight percent.

5. The method of claim 1 wherein said olefinic elastomer is selected from the group consisting of ethylene copolymer elastomers and ethylene terpolymer elastomers.

6. The method of claim 1 wherein said olefinic elastomers selected from the group consisting of polyisobutylene, isobutylene-isoprene copolymer elastomers and halogenated isobutylene-isoprene copolymer elastomers.

7. The method of claim 5 wherein said olefinic elastomer comprises a copolymer of ethylene and propylene.

8. The method of claim 5 wherein said olefinic elastomer comprises a terpolymer of ethylene, propylene and a nonconjugated diene.

9. The composition of claim 2 wherein said isoprene copolymer elastomer comprises a copolymer of isobutylene and isoprene.

10. The composition of claim 2 wherein said halogenated isoprene copolymer elastomer comprises chlorinated isobutylene isoprene elastomer or brominated isobutylene isoprene elastomer.

11. The method of claim 1, wherein said polyethylene of said component (a) is selected from the group consisting of high density polyethylene and linear low density polyethylene.

12. The method of claim 1 wherein said unsaturated ester of a lower carboxylic acid is selected from the group consisting of vinyl esters and alkyl acrylates.

13. The method of claim 11 wherein said vinyl ester comprises vinyl acetate.

14. The method of claim 11 wherein said alkyl acrylate is selected from the group consisting of methyl acrylate and ethyl acrylate.

15. The method of claim 1 wherein said hydrocarbon oil is selected from the group consisting of paraffinic, naphthenic and aromatic oils.

16. The method of claim 1 wherein said polypropylene reactor copolymer includes ethylene from about 1 to about 20 weight percent.

17. A film produced by the method of claim 1.

18. A film produced by the method of claim 1 and a film manufacturing process selected from the group consisting of cast extrusion, blown film, tubular water bath extrusion, cast coextrusion, and extrusion coating.

19. The method of claim 1 wherein said elastomeric plasticizer and said polypropylene or polypropylene reactor copolymer are each in pellet form.

20. The method of claim 1 further comprising up to about 30 weight percent of said elastomeric plasticizer of an olefinic plastic.

21. The method of claim 20 wherein said olefinic plastic is selected from the group consisting of polypropylene, high density polyethylene and polypropylene reactor copolymer.

* * * * *